Feb. 23, 1971 J. L. MASSEY 3,566,352

ERROR CORRECTION IN CODED MESSAGES

Filed Sept. 4, 1968 2 Sheets-Sheet 2

United States Patent Office
3,566,352
Patented Feb. 23, 1971

3,566,352

ERROR CORRECTION IN CODED MESSAGES

James Lee Massey, South Bend, Ind., assignor to Codex Corporation, Watertown, Mass., a corporation of Delaware Filed Sept. 4, 1968, Ser. No. 757,323
Int. Cl. G06f *11/12;* G08c *25/00*
U.S. Cl. 340—146.1 7 Claims

ABSTRACT OF THE DISCLOSURE

Error correction in convolutionally coded messages, using a plurality of information digit streams and a single parity digit stream with each information digit being included as a component in the defining summation for exactly two parity digits spaced apart by a certain number of time intervals (a time interval being defined to include a digit from each stream), the time interval spacing between the two parity digits being the same for each information digit in a given stream but different for each stream, the spacing being longer than the design correctable burst length but shorter than twice the design correctable burst length for all but at most one of the information digit streams.

This application relates to correction of errors in convolutionally coded messages.

Objects of the invention are to provide for correction of bursts of errors with a small amount of equipment relative to the correctable burst length, while reducing the guard space required between correctable bursts, with a system also capable of efficient correction of some scattered errors.

In general the invention features an encoder which defines a plurality of information digit streams and a single parity digit stream, with each information digit being included as a component in the defining summation for exactly two parity digits spaced apart by a certain number of time intervals (a time interval being defined to include a digit from each stream), the time interval spacing between the two parity digits being the same for each information digits in each stream by examining, for each stream, the spacing being longer than the design correctable burst length but shorter than twice the design correctable burst length for all but at most one of the information digit streams. In the decoder the invention features forming syndrome digits, one pair of which check each information digit, correcting erroneously received information digits in each stream by examining, for each information digit, a pair of syndrome digits spaced apart by the number of time intervals associated with the spacing of the parity digits that include common information digits in that stream, and using decoding results in interdependent decoding of other information digits in the same and subsequent time intervals and in the same and other sterams.

Figure 1:
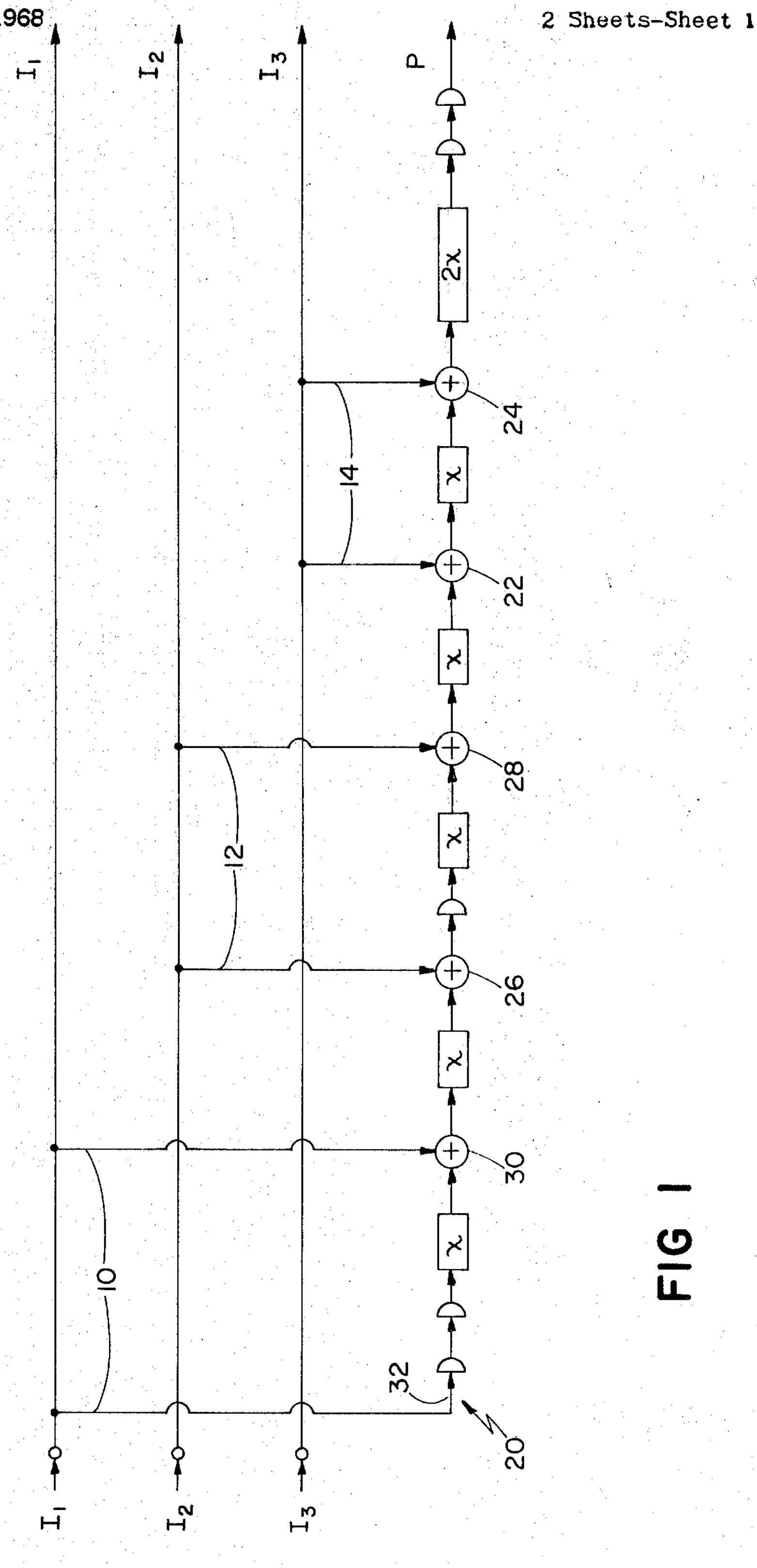
Figure 2:
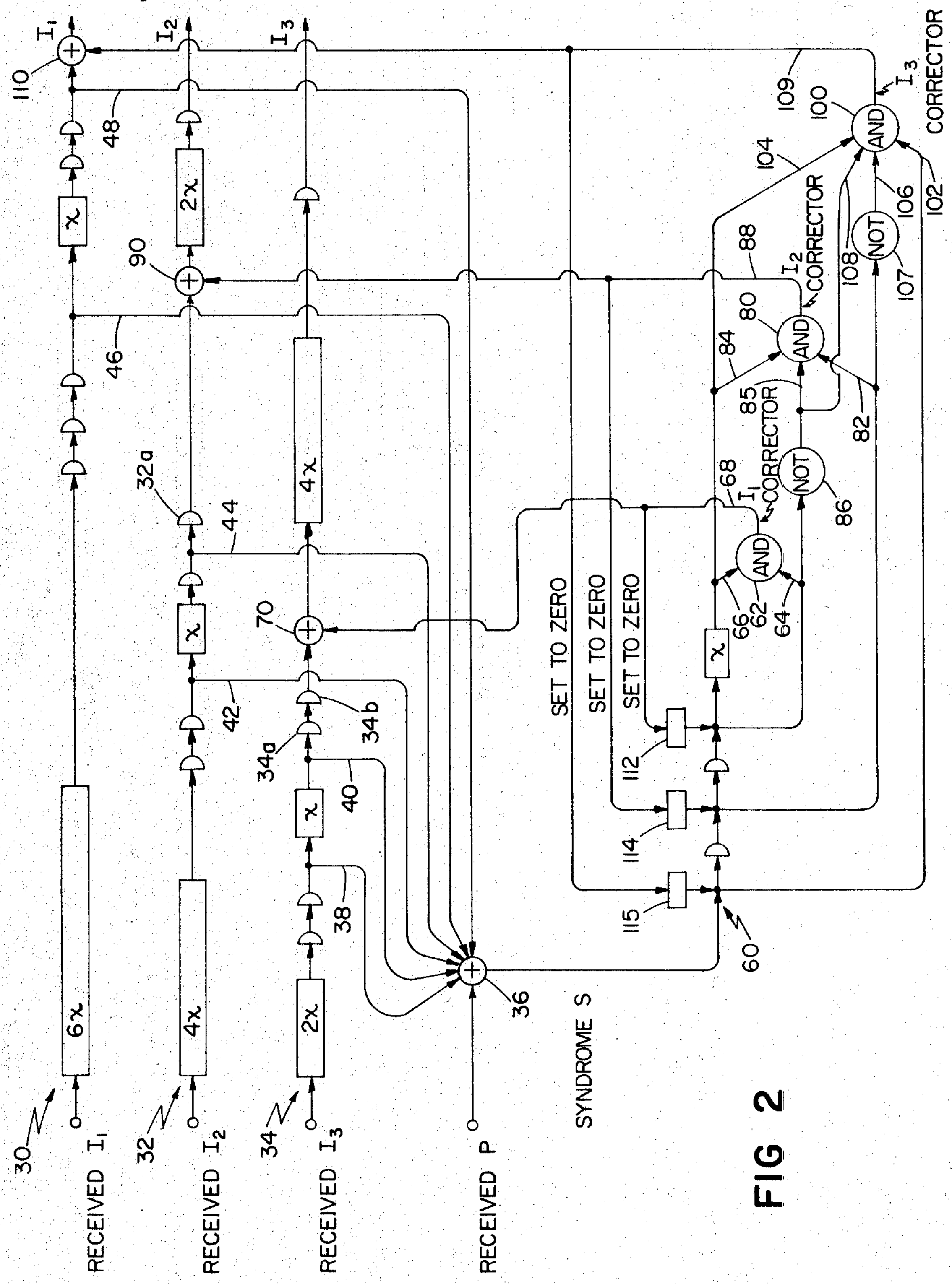

Other objects, features, and advantages of the invention will be apparent from the following description of a preferred embodiment thereof, taken together with the drawings in which FIG. 1 is a block diagram of an encoder of the invention for a rate 3/4 code; and FIG. 2 is a block diagram of a decoder for decoding a message encoded by the encoder of FIG. 1.

Referring to FIG. 1, the information digits to be encoded are separated (at least conceptually) into three streams $I_1$, $I_2$, and $I_3$, and taps 10, 12, 14 are provided from the information digit streams to a delay line 20 for forming the digits of a parity digit stream P. The system is designed to correct a burst of errors of length X time intervals, where a time interval is defined to include one digit from each of the four streams (considering the digits to be sent out onto the channel with one parity digit interleaved between every three information digits in such a manner that the first channel digit is the first digit of stream $I_1$ the second channel digit is the first digit of stream $I_2$, the third channel digit is the first digit of $I_3$, the fourth channel digit is the first digit of stream P, the fifth channel digit is the second digit of stream $I_1$, etc.

As shown in FIG. 1, the pair of taps 14 from the $I_3$ stream are respectively connected to modulo-2 adders 22 and 24 separated in line 20 by X units of delay; the pair of taps 12 from the $I_2$ stream are respectively connected to adders 26, 28 separated in line 20 by $X+1$ units of delay; and the pair of taps 10 from the $I_1$ stream are connected respectively to the input 32 to line 20 and to added 30 separated by $X+2$ units of delay from input 32. In addition, X units of delay are placed in line 20 between the adjacent taps 12 and 14, and between the adjacent taps 10 and 12, and $2X+2$ units of delay are placed after the last tap 14.

The resulting partly digits are interleaved with the information digits and sent out onto the communication channel. The following chart I indicates the information digits that are combined linearly by modulo 2 addition to form the parity digits transmitted at successive time intervals.

CHART I $$\begin{cases} p_0=0 \\ \vdots \\ p_{2X+1}=0 \end{cases}$$

$$\begin{cases} p_{2X+2}=i^3_0 \\ \vdots \\ p_{3X+1}=i^3_{X-1} \end{cases}$$

$$\begin{cases} p_{3X+2}=i^3_X+i^3_0 \\ \vdots \\ p_{4X+1}=i^3_{2X-1}+i^3_{X-1} \end{cases}$$

$$\begin{cases} p_{4X+2}=i^3_{2X}+i^3_X+i^2_0 \\ \vdots \\ p_{5X+1}=i^3_{3X-1}+i^3_{2X-1}+i^2_{X-1} \end{cases}$$

$$\{ p_{5X+2}=i^3_{3X}+i^3_{2X}+i^2_X$$

$$\begin{cases} p_{5X+3}=i^3_{3X+1}+i^3_{2X+1}+i^2_{X+1}+i^2_0 \\ \vdots \\ p_{6X+2}=i^3_{4X}+i^3_{3X}+i^2_{2X}+i^2_{X-1} \end{cases}$$

$$\begin{cases} p_{6X+}{}^3=i^3_{4X+1}+i^3_{3X+1}+i^2_{2X+1}+i^2_{X+}+i^1_0 \\ \vdots \\ p_{7X+2}=i^3_{5X}+i^3_{4X}+i^2_{3X}+i^2_{2X-1}+i^1_{X-1} \end{cases}$$

$$\begin{cases} p_{7X+3}=i^3_{5X+1}+i^3_{4X+1}+i^2_{3X+1}+i^2_{2X}+i^1_X \\ p_{7X+4}=i^3_{4X+2}+i^3_{4X+2}+i^2_{3X+2}+i^2_{2X+1}+i^1_{X+1} \end{cases}$$

$$\begin{cases} p_{7X+5}=i^3_{5X+3}+i^3_{4X+3}+i^2_{3X+3}+i^2_{2X+2}+i^1_{X+2}+i^1_0 \\ \vdots \\ p_{8X+4}=i^3_{6X+2}+i^3_{5X+2}+i^2_{4X+2}+i^2_{3X+1}+i^1_{2X+1}+i^1_{X-1} \end{cases}$$

Each information digit is included in exactly two parity digits, and it can be seen that each two parity digits that include in common a digit from the $I_3$ stream are spaced by X time intervals. Similarly, each two parity digits that include in common a digit from the $I_2$ stream are $2X+2$, the parity digit $p_{2X+2}$ is sent onto the channel and spaced by $X+1$ time intervals, and each two parity digits that include in common a digit from the $I_1$ stream are spaced by $X+2$ time units. For example, at time interval is simply the time interval zero digit $i_0^3$ in the $I_3$ stream, with the superscript identifying the stream and the subscript identifying the time interval of the digit in the stream. At time interval $3X+2$, parity digit $p_{3X+2}$ (the second parity digit that includes $i_0^3$) is sent onto the channel; this digit is the modulo 2 sum of $i_0^3$ and $i^3$.

The effect of the channel can be represented by the modulo-2 addition of an error component $e$ to each chandigit where $e=0$ if the digit is received correctly and $e=1$ if the digit is received in error. The error component of $i_0^3$ is denoted as $e_0^{i3}$ where again the superscript identifies the stream and the subscript identifies the time interval.

The decoder corresponding to the encoder of FIG. 1 is shown in FIG. 2. The information digits are cycled into delay lines 30, 32, 34 corresponding respectively to the three streams $I_1$, $I_2$, and $I_3$, and the parity digits are sent directly to modulo 2 adder 36 in such manner that digits from the same time interval enter in synchronism. Adder 36 also has a pair of inputs from each delay line 30, 32, 34. Taps 38 and 40 from line 34 are placed after $2X+2$ and $3X+2$ delay units in line 34, respectively. Taps 42, and 44 from line 32 are placed after $4X+2$ and $5X+3$ delay units in line 32, respectively. Taps 46, 48 from line 30 are placed after $6X+3$ and $7X+5$ delay units in line 30, respectively. It can thus be seen that adder 36 serves to recompute from the received information digits parity check digits corresponding to the original parity digits (and equal to those parity digits in the absence of error in the received information digits), and to add to each parity check digit the corresponding received parity digit, producing at its output a stream of syndrome digits S which depend only on the error components of the channel digits. The syndrome digits enter syndrome delay line 60 having $X+2$ units of delay. The following chart II shows the values of the syndrome digits entering line 60 at each time interval.

CHART II $$\begin{cases} s_0 = e_0^p \\ \vdots \\ s_{X-1} = e_{X-1}^p \end{cases}$$

$$\begin{cases} s_X = e_X^p \\ \vdots \\ s_{2X+1} = e_{2X+1}^p \end{cases}$$

$$\begin{cases} s_{2X+2} = e_{2X+2}^p + e_0^{i3} \\ s_{2X+3} = e_{2X+3}^p + e_1^{i3} \\ \vdots \\ s_{3X+1} = e_{3X+1}^p + e_{X-1}^{i3} \end{cases}$$

$$\begin{cases} s_{3X+2} = e_{3X+2}^p + e_X^{i3} + e_0^{i3} \\ \vdots \\ s_{4X+1} = e_{4X+1}^p + e_{2X-1}^{i3} + e_{X-1}^{i3} \end{cases}$$

$$\begin{cases} s_{4X+2} = e_{4X+2}^p + e_{2X}^{i3} + e_X^{i3} + e_0^{i2} \\ \vdots \\ s_{5X+1} + e_{5X+1}^p + e_{3X-1}^{i3} + e_{2X-1}^{i3} + e_{X-1}^{i2} \end{cases}$$

CHART II.—Continued $$\{ s_{5X+2} = e_{5X+2}^p + e_{3X}^{i3} + e_{2X}^{i3} + e_X^{i2}$$

$$\begin{cases} s_{5X+3} = e_{5X+3}^p + e_{3X+1}^{i3} + e_{2X+1}^{i3} + e_{X+1}^{i2} + e_0^{i2} \\ \vdots \\ s_{6X+2} = e_{6X+2}^p + e_{4X}^{i3} + e_{3X}^{i3} + e_{2X}^{i2} + e_{X-1}^{i2} \end{cases}$$

$$\begin{cases} s_{6X+3} = e_{6X+3}^p + e_{4X+1}^{i3} + e_{3X+1}^{i3} + e_{2X+1}^{i2} + e_X^{i2} + e_0^{i1} \\ \vdots \\ s_{7X+2} = e_{7X+2}^p + e_{5X}^{i3} + e_{4X}^{i3} + e_{3X}^{i2} + e_{2X-1}^{i2} + e_{X-1}^{i1} \end{cases}$$

$$\begin{cases} s_{7X+3} = e_{7X+3}^p + e_{5X+1}^{i3} + e_{4X+1}^{i3} + e_{3X+1}^{i2} + e_{2X}^{i2} + e_X^{i1} \\ s_{7X+4} = e_{7X+4}^p + e_{5X+2}^{i3} + e_{4X+2}^{i3} + e_{3X+2}^{i2} + e_{2X+1}^{i2} + e_{X+1}^{i1} \end{cases}$$

$$\begin{cases} s_{7X+5} = e_{7X+5}^p + e_{5X+3}^{i3} + e_{4X+3}^{i3} + e_{3X+3}^{i2} + e_{2X+2}^{i2} + e_{X+2}^{i1} + e_0^{i1} \\ \vdots \\ s_{8X+4} = e_{8X+4}^p + e_{6X+2}^{i3} + e_{5X+2}^{i3} + e_{4X+2}^{i2} + e_{3X+1}^{i2} + e_{2X+1}^{i1} + e_{X-1}^{i1} \end{cases}$$

AND gate 62 (its output is 1 only when both inputs are 1) has inputs 64, 66 from line 60 following 2 and $X+2$ units of delay respectively, and has its output 68 connected to modulo 2 adder 70 in $I_3$ line 34. Two additional units of delay 34*a*, 34*b* are inserted in line 34 between tap 40 and adder 70, and $4X+1$ units of delay are inserted after adder 70.

AND gate 80 has inputs 82, 84 from line 60 following 1 and $X+2$ units of delay, respectively, and has an additional input 85 through NOT gate 86 (which gives the complement of its input) from line 60 after 2 units of delay. Output 88 from gate 80 is connected to modulo 2 adder 90 in $I_2$ line 32. One additional unit of delay 32*a* is inserted in line 32 between tap 44 and adder 90, and $2X+1$ units of delay are inserted after adder 90.

AND gate 100 has inputs 102, 104 from the beginning and end of line 60, respectively, and has additional input 106 through NOT gate 107 from line 60 after 1 unit of delay, and additional input 108 from NOT gate 86. The output 109 of gate 100 is connected to modulo 2 adder 110 at the end of $I_1$ line 30.

The output of AND gate 62 is also connected to line 60 after 2 units of delay through a gate 112 which sets to zero the digit progressing rightward at that position in line 60 whenever the output of gate 62 is one. Similarly, the output of gate 80 is connected to line 60 after one unit of delay through gate 114 identical to gate 112, and the output of gate 100 is connected to the input position in line 60 through gate 115 identical to gate 112.

In operation, the syndrome digits $s_0$ through $s_{X+1}$ will reflect $e_0^p$ through $e_{X-1}^p$, the errors in parity digits $p_0$ through $p_{X-1}$. At time intervals 2X+2 the syndrome digit formed by adder 36 is $$s_{2X+2} = p_{2X+2} + e_2{}^p{}_{X+2} + i_0{}^3 + e_0{}^{i3} = e_2{}^p{}_{X+2} + e_0{}^{i3}$$

Similarly, at time 3X+2, the output of adder 36 is $$s_{3X+2} = e_3 p_{x+2} + e_X^{i3} + e_0^{i3}$$

At time 3X+4 the inputs to gate 72 are $S_{2X+2}$, and the output of gate 72 will be 1 if there was a burst of errors affecting $i_0^3$. Since $s_{2X+2}$ and $s_{3X+2}$ have no pair of error components (other than $e_0^{i3}$ which appears in each) drawn from positions in the transmitted stream within a burst length X of each other, it can be assumed that gate 72 will have an output of 1 only when $i_0^3$ is received in error. In that event, adder 70 will correct $i_0$, which, it will be noted, has arrived at adder 70 at time interval 3X+4 (delay units 34*a* and 34*b* having been inserted for this reason, and delay unit 32*a* playing the same role in line 32). Upon correction of $i_0^3$, $s_{3X+2}$ is set to zero, so that a false correction will not subsequently be made of $i_X^3$ at time 4X+4 when $s_{3X+2}$ arrives at input 66 to gate 62. (Such a correction would be false since an error burst of maximum correctable length X which affects $i_0^3$ cannot also affect $i_0^3$.) In this way, the results of decoding $i_0^3$ are used in decoding other digits in the $I_3$ stream at subsequent time intervals, and the decoding of digits in successive time units is thus interdependent.

At time 3X+4, the inputs to gate 80 are $S_{2X+2}$, the complement of $S_{3X+2}$ (written here as $\bar{S}_{3X+2}$), and $S_{3X+3}$. If a correction has been made to $i_0^3$, $\bar{S}_{3X+2}$ will be zero, thus ensuring that the output of gate 80 will be zero and preventing a false correction in the $I_2$ stream. (Such a correction would be false since $i_0^2$ will not arrive at adder 90 until time 5X+4, more than a burst length X of time intervals away, so that the $I_2$ digits appearing at adder 90 at time 3X+4 could not be affected by a burst affecting $i_0^3$.) In this way, the results of decoding in the $I_3$ stream in a given time interval are used in decoding digits in the $I_2$ stream during the same time interval.

At time interval 3X+4, the inputs to gate 100 are $S_{2X+2}$, $\bar{S}_{3X+2}$, $\bar{S}_{3X+3}$, and $S_{3X+4}$ and again, false correction in the $I_1$ stream is prevented by the term $\bar{S}_{3X+2}$, so that $I_1$ stream decoding is also dependent upon the result of decoding in the $I_3$ stream in the same time interval.

The inputs to gates 72, 80, and 100 for other time units are shown in the following Chart III.

CHART III

| Time | Gate 72 inputs | $i^3$ decoded | Gate 80 inputs | $i^2$ decoded | Gate 100 inputs | $i^1$ decoded |
|---|---|---|---|---|---|---|
| X+2 | $s_X \cdot s_0$ | -------- | $s_{X+1} \cdot \bar{s}_X \cdot s_0$ | -------- | $s_{X+2} \cdot s_{X+1} \cdot \bar{s}_X \cdot s_0$ | |
| ⋮ | | | | | | |
| 3X+4 | $s_{3X+2} \cdot s_{2X+2}$ | $i_0{}^3$ | $s_{3X+3} \cdot \bar{s}_{3X+2} \cdot s_{2X+2}$ | -------- | $s_{3X+4} \cdot \bar{s}_{3X+3} \cdot \bar{s}_{3X+2} \cdot s_{2X+2}$ | |
| ⋮ | | | | | | |
| 4X+3 | $s_{4X+1} \cdot s_{3X+1}$ | $i^3{}_{X-1}$ | $s_{4X+2} \cdot \bar{s}_{4X+1} \cdot s_{3X+1}$ | -------- | $s_{4X+3} \cdot \bar{s}_{4X+2} \cdot \bar{s}_{4X+1} \cdot s_{3X+1}$ | |
| 4X+4 | $s_{4X+2} \cdot s_{3X+2}$ | $i^3{}_X$ | $s_{4X+3} \cdot \bar{s}_{4X+2} \cdot s_{3X+2}$ | -------- | $s_{4X+4} \cdot \bar{s}_{4X+3} \cdot \bar{s}_{4X+2} \cdot s_{3X+2}$ | |
| ⋮ | | | | | | |
| 5X+3 | $s_{5X+1} \cdot S_{4X+1}$ | $i^3{}_{2X+1}$ | $s_{5X+2} \cdot \bar{s}_{5X+1} \cdot s_{4X+1}$ | -------- | $s_{5X+3} \cdot \bar{s}_{5X+2} \cdot \bar{s}_{5X+1} \cdot s_{4X+1}$ | |
| 5X+4 | $s_{5X+2} \cdot s_{4X+2}$ | $i^3{}_{2X}$ | $s_{5X+3} \cdot \bar{s}_{5X+2} \cdot s_{4X+2}$ | $i^2{}_0$ | $s_{5X+4} \cdot \bar{\bar{s}}_{5X+3} \cdot \bar{s}_{5X+2} \cdot s_{4X+2}$ | |
| 5X+5 | $s_{5X+3} \cdot s_{4X+3}$ | $i^3{}_{2X+1}$ | $s_{5X+4} \cdot \bar{s}_{55X+3} \cdot s_{4X+3}$ | $i^2{}_1$ | $s_{5X+5} \cdot s_{5X+4} \cdot \bar{s}_{5X+3} \cdot s_{4X+3}$ | |
| ⋮ | | | | | | |
| 6X+3 | $s_{6X+1} \cdot s_{5X+1}$ | $i^3{}_{3X+1}$ | $s_{6X+2} \cdot \bar{s}_{6X+1} \cdot s_{5X+1}$ | $i^2{}_{X+1}$ | $s_{6X+3} \cdot \bar{s}_{6X+2} \cdot \bar{s}_{6X+1} \cdot s_{5X+1}$ | |
| 6X+4 | $s_{6X+2} \cdot s_{5X+2}$ | $i^3{}_{3X}$ | $s_{6X+3} \cdot \bar{s}_{6X+2} \cdot s_{5X+2}$ | $i^2{}_X$ | $s_{6X+4} \cdot \bar{s}_{6X+3} \cdot \bar{s}_{6X+2} \cdot s_{5X+2}$ | |
| 5X+5 | $s_{6X+3} \cdot s_{5X+3}$ | $i^3{}_{3X+1}$ | $s_{6X+4} \cdot \bar{s}_{6X+3} \cdot s_{5X+3}$ | $i^2{}_{X+1}$ | $s_{6X+5} \cdot \bar{s}_{6X+4} \cdot \bar{s}_{6X+3} \cdot s_{5X+3}$ | |
| ⋮ | | | | | | |
| 7X+4 | $s_{7X+2} \cdot s_{6X+2}$ | $i^3{}_{4X}$ | $s_{7X+3} \cdot \bar{s}_{7X+2} \cdot s_{6X+2}$ | $i^2{}_{2X}$ | $s_{7X+4} \cdot \bar{s}_{7X+3} \cdot \bar{s}_{7X+2} \cdot s_{6X+2}$ | |
| 7X+5 | $s_{7X+3} \cdot s_{6X+3}$ | $i^3{}_{4X+1}$ | $s_{7X+4} \cdot \bar{s}_{7X+3} \cdot s_{6X+3}$ | $i^2{}_{2X+1}$ | $s_{7X+5} \cdot \bar{s}_{7X+4} \cdot \bar{s}_{7X+3} \cdot s_{6X+3}$ | $i^1{}_0$ |
| 7X+6 | $s_{7X+4} \cdot s_{6X+4}$ | $i^3{}_{4X+2}$ | $s_{7X+5} \cdot \bar{s}_{7X+4} \cdot s_{6X+4}$ | $i^2{}_{2X+1}$ | $s_{7X+6} \cdot \bar{s}_{7X+5} \cdot \bar{s}_{7X+4} \cdot s_{6X+4}$ | $i^1{}_1$ |
| ⋮ | | | | | | |
| 8X+4 | $s_{8X+2} \cdot s_{7X+2}$ | $i^3{}_{5X}$ | $s_{8X+3} \cdot \bar{s}_{8X+2} \cdot s_{7X+2}$ | $i^2{}_{3X}$ | $s_{8X+4} \cdot {}_{8X+3} \cdot \bar{s}_{8X+2} \cdot s_{7X+2}$ | $i^1{}_{X+1}$ |

Decoding of $i_0^3$ through $i_{X-1}^3$ occurs between times 3X+4 and 4X+3; decoding of $i_0^2$ through $i_{X-1}^2$ occurs between times 5X+4 and 6X+3; and decoding of $i_0^3$ through $i_{X-1}^1$ occurs between times 7X+5 and 8X+4. The delay units following adders 70 and 90 bring digits $i_j$ of like subscript from each of the streams into synchronization with each other at the decoder output to be re-interleaved if desired.

The effect of NOT gates 86 and 107 is to add out of the syndrome digits used by gate 80 in the $I_2$ stream decoding, any error in the $I_3$ stream digit decoded in the same time interval, and to add out of the syndromes used by gate 100 in the $I_1$ stream decoding, any errors in the $I_3$ and $I_2$ stream digits decoded in the same time interval.

To see that the effect of gates 86 and 107 is that of adding out errors in other streams, consider the decoding at time 7X+5. In the $I_3$ stream, the digit decoded is $i_{4X+1}^3$ The error in this term is $$e_{4X+1}^{i3} = S_{7X+3} \cdot S_{6X+3}$$

If, instead of using gate 86, this error is directly added modulo 2 to $S_{6X+3}$ for use in $I_2$ decoding of digit $i_{2X+1}^2$, the result would be $$\begin{aligned} e_{2X+1}^{i2} &= S_{7X+4} \cdot [S_{6X+3} + e_{4X+1}^{i3}] \\ &= S_{7X+4} \cdot [S_{6X+3} + (S_{7X+3} \cdot S_{6X+3})] \\ &= S_{7X+4} \cdot S_{6X+3} \cdot [1 + S_{7X+3}] \\ &= S_{7X+4} \cdot S_{6X+3} \cdot \bar{S}_{7X+3} \end{aligned}$$

since the effect of adding a 1 modulo 2 is complementation. Similarly, in the $I_1$ stream the inputs to gate 100 are $S_{7X+5}$, $S_{6X+3}$, $\bar{S}_{7X+4}$, and $\bar{S}_{7X+3}$, for decoding $i\ 1_0$. If, instead of using the NOT gate, the errors from the $I_3$ and $I_2$ stream in the same time interval are directly added out of $S_{6X+3}$, we have $$\begin{aligned} e_0^{i1} &= S_{7X+5} \cdot [S_{6X+3} + e_{4X+1}^{i3} + e_{2X+1}^{i2}] \\ &= S_{7X+5} \cdot [S_{6X+3} + (S_{7X+3} \cdot S_{6X+3}) + (S_{7X+4} \cdot \bar{S}_{7X+3} \cdot S_{6X+3})] \\ &= S_{7X+5} \cdot S_{6X+3} \cdot [1 + S_{7X+3} + (S_{7X+4} \cdot \bar{S}_{7X+3})] \\ &= S_{7X+5} \cdot S_{6X+3} \cdot [\bar{S}_{7X+3} + (S_{7X+4} \cdot \bar{S}_{7X+3})] \\ &= S_{7X+5} \cdot S_{6X+3} \cdot \bar{S}_{7X+3} \cdot [1 + S_{7X+4}] \\ &= S_{7X+5} \cdot S_{6X+3} \cdot \bar{S}_{7X+3} \cdot \bar{S}_{7X+4}. \end{aligned}$$

The embodiment described will correct error bursts of X time intervals or less with a guard space of 7X+5 time intervals. In terms of interleaved digits on the channel, it will correct bursts of up to 4X serial digits with a guard space of 28X+23 serial digits. In terms of equipment, the encoder requires 7X+5 units of delay and the decoder requires 22X+17 units of delay. The invention is particularly useful for the telephone channel, with X of the order of ten. During periods when there are only scattered errors on the channel, the decoder will correct single scattered errors with the probability of a decoding error being approximately $35p^2$, where $p << 1$ is the independent probability of each bit being received in error.

(For p about $10^{-4}$ the decoded digits would have error probability of about $3.5\times10^{-7}$, an improvement by a factor of about 300 over the raw received digits.)

Generalizing the invention for other rates $N-1/N$, $N>2$, the following chart III indicates the number of delay units between the input to each information stream delay line in the decoder and the two positions in that line tapped to send signals to the syndrome adder 36. These same numbers of delay units are employed in the encoder after the adders in the parity digit delay line tapped to the respective information streams.

CHART IV

| N | Stream $I_1$ | $I_2$ | $I_3$ | $I_4$ | $I_5$ | $I_6$ | $I_7$ |
|---|---|---|---|---|---|---|---|
| 3 | 4X+1<br>5X+2 | 2X+1<br>3X+1 | | | | | |
| 4 | 6X+3<br>7X+5 | 4X+2<br>5X+3 | 2X+2<br>3X+2 | | | | |
| 5 | 8X+6<br>9X+9 | 6X+4<br>7X+6 | 4X+3<br>5X+4 | 2X+3<br>3X+3 | | | |
| 6 | 10X+10<br>11X+14 | 8X+7<br>9X+10 | 6X+5<br>7X+7 | 4X+4<br>5X+5 | 2X+4<br>3X+4 | | |
| 7 | 12X+15<br>13X+20 | 10X+11<br>11X+15 | 8X+8<br>9X+11 | 6X+6<br>7X+8 | 4X+5<br>5X+6 | 2X+5<br>3X+5 | |
| 8 | 14X+21<br>15X+27 | 12X+16<br>13X+21 | 10X+12<br>11X+16 | 8X+9<br>9X+12 | 6X+7<br>7X+9 | 4X+6<br>5X+7 | 2X+6<br>3X+6 |

Chart IV extends to $N=8$, and values for $N>8$ can be obtained by noting that the general entries A, B under stream $I_j$ ($J<N$) are:

(1) $2(N-j)X+(N-2)+\frac{1}{2}(N-j-1)(N-j-2)=A$ (2) $A+X+(N-j-1)=B$

In general, it can be seen that the spacings between the two taps to the information streams form a monotonically increasing arithmetic series beginning with X as j decreases from $N-1$ to 1. Increase in these minimum spacings is possible, of course, but at the cost of extra units of delay.

The invention in general is capable of correcting bursts up to X time intervals long separated by a guard space of $(2N-1)X+\frac{1}{2}N(N-1)-1$ time intervals, and with the digits interleaved will correct bursts up to NX serial digits long separated by a guard space of $N[2N-1)X+N(N-1)]+(N-1)$ serial digits. For scattered errors, with each digit having a small probability $p$ of being received erroneously, the decoded digits will have an error probability of approximately $(2N^2+2N-5)p^2$. The decoder requires $(2N^2-3N+2)X+\frac{1}{2}N(N-1)^2-1$ units of delay, and the encoder requires $(2N-1)X+\frac{1}{2}N(N-1)-1$ units of delay.

Other embodiments will occur to those skilled in the art and are considered to be within the scope of the following claims.

What is claimed is:

1. An encoder for an error correcting system capable of correcting error bursts that extend over X or fewer time intervals, comprising an effective plurality $N-1$ of information digit lines to define a plurality of $N-1$ streams of information digits, a plurality $2(N-1)$ of delay means connected in series connection, the first delay means in said series connection having delay length of $X+N-2$ time intervals, the third delay means in said series connection having delay length of $X+N-3$ time intervals, and each succeeding odd position delay means in said series connection having delay length of successively one less time interval, the second delay means in said series connection having delay length of X time intervals, and each succeeding even position delay means in said series connection also having delay length of X time intervals, connection means for connecting the first of said plurality of information digit lines to the beginning of said series connection of delay means, and a plurality $2(N-1)-1$ of combination devices, each of said combination devices interposed between two of said delay means in said series connection and connected to one of said plurality of information digit lines to cause the digit on said information digit line to be digitally added to the digit progressing between said two delay means, the first of said combination devices interposed along said series connection of delay means connected to the first of said plurality of information digit lines, the second and third of said combination devices connected to the second of said plurality of information digit lines, and each succeeding pair of said combination devices connected to the next succeeding of said plurality of information digit lines, whereby said encoder forms a single stream of parity digits as linear combinations of information digits to provide a convolutional code such that all parity digits that include a given information digit as a term are spaced from each other and from said given information digit by at least X time intervals in the output of the encoder, each time interval containing a digit from each stream, each information digit being effectively included as a component in exactly two parity digits, the pairs of parity digits that include common information digits of any one of said streams during a span of X time intervals not including information digits from any other stream in the same span of X time intervals, the spacing in time intervals between pairs of parity digits that include a common information digit of any one of said $N-1$ streams of information digits being at least X, but less than 2X, and being different for each one of said $N-1$ streams of information digits, and pairs of parity digits that include common information digits of any one of said streams during a span of X time intervals not being separated by any parity digit that includes an information digit from any other stream in the same span of X time intervals, said encoder thereby being capable of generating a coded message having a guard space of substantially $$(2N-1)X+N(N-1)2-1$$

time intervals between correctionable bursts of X time intervals or less duration.

2. In combination with the encoder of claim 1, a decoder comprising means for receiving streams of information digits and the stream of parity digits corresponding to said streams defined by said encoder, a combining device for forming syndrome digits to check the received information digits, connection means to feed the reecived parity stream directly to said combining device, connecting means for feeding the digits from each received information stream to said combining device twice, the appearance at said combining device of any digit from a given stream being separated by said number of time intervals uniquely corresponding to that stream to produce at the output of said combining device a pair of syndrome digits for checking each received information digit, decision means responsive to said syndrome digits for correcting erroneously received information digits, said decision means comprising syndrome delay means through which said syndrome digits progress, combining devices respectively corresponding to said information streams and connected to said syndrome delay means at positions spaced to enable the combining of pairs of syndrome digits spaced apart by said member of time intervals uniquely corresponding to said stream and the generating of correction signals for said stream, and means for using the result of decoding a digit from one information stream in interdependent decoding in the same time interval of digits from other information streams, and in subsequent time intervals of other information digits.

3. The combination of claim 2 wherein said last mentioned means comprise circuitry for effectively adding out of one of the syndrome digits used to decode a digit from one information stream in a given time interval, the error component of at least one digit from another information stream decoded during the same time interval.

4. The combination of claim 3 wherein said circuitry for effectively adding comprising an extra input to said combining device corresponding to said one information stream, and a gate connected to said input for transmitting thereto the complement of one of the syndrome digits used to decode said digit from said other information stream during said same time interval.

5. The combination of claim 4 wherein there are at least three information streams and one of said combining devices has two extra inputs to which are connected gates for transmitting thereto the complements of syndrome digits used to decode digits from two other information streams during said same time interval.

6. The device of claim 3 wherein said last mentioned means further comprises means for setting to zero at least one syndrome digit of each pair of syndrome digits used to correct erroneously received information digits.

7. A decoder capable of correcting error bursts that extend over X or fewer time intervals in a convolutionally coded message in which are defined a plurality of $N-1$ of streams of information digits and a single stream of parity digits formed as linear combinations of information digits such that all parity digits that include a given information digit as a term are spaced from each other and from said given information digit by at least X time intervals, each time interval containing a digit from each stream, each information digit being included as a common component in exactly two parity digits, the partiy digits in each pair that has in common an information digit of a given stream being spaced the same given number of time intervals apart, said given spacing being different from each stream, said given spacing for all but at most one of said streams being more than X but less than 2X, the pairs of parity digits that include the information digits of any one of said streams during a space of X time intervals being arranged so as not to include information digits from any other stream in the same span of X time intervals and so as not to be separated by any parity digit that includes an information digit from any other stream in the same span of X time intervals, said decoder comprising means for receiving streams of information digits and the stream of partity digits corresponding to said streams defined by said encoder, a combining device for forming syndrome digits to check the received information digits, connection means to feed the received parity stream directly to said combining device, connecting means for feeding the digits for each received information stream to said combining device twice, the appearance at said combining device of any digit from a given stream being separated by said number of time intervals uniquely corresponding to that stream to produce at the output of said combining device a pair of syndrome digits for checking each received information digit, decision means responsive to said syndrome digits for correcting erroneously received information digits, said decision means comprising syndrome delay means through which said syndrome digits progress, combining devices respectively corresponding to said information streams and connected to said syndrome delay means at positions spaced to enable the combining of pairs of syndrome digits spaced apart by said member of time intervals uniquely corresponding to said stream and the generating of correction signals for said stream, and means for using the result of decoding a digit from one information stream in interdependent decoding in the same time interval of digits from other information streams, and in subsequent time intervals of other information digits.

References Cited

UNITED STATES PATENTS

| | | | |
|---|---|---|---|
| 2,956,124 | 10/1960 | Hagelbarger | 340—146.1X |
| 3,402,393 | 9/1968 | Massey | 340—146.1X |
| 3,447,132 | 5/1969 | Kohlenberg | 340—146.1 |
| 3,452,328 | 6/1969 | Hsial et al. | 340—146.1 |
| 3,465,287 | 9/1969 | Kennedy et al. | 340—146.1 |
| 3,469,236 | 9/1969 | Gallager | 340—146.1 |

OTHER REFERENCES

W. W. Peterson: Error Correcting Codes, The M.I.T. Press and John Wiley & Sons, Inc., 1961, 217–232.

MALCOLM A. MORRISON, Primary Examiner

C. E. ATKINSON, Assistant Examiner

U.S. Cl. X.R.

235—153

UNITED STATES PATENT OFFICE
CERTIFICATE OF CORRECTION

Patent No. 3,566,352 Dated February 23, 1971

Inventor(s) James Lee Massey

It is certified that error appears in the above-identified patent and that said Letters Patent are hereby corrected as shown below:

Col. 1, line 43, change "digits in each stream by examining," to --digit in a given stream but different--.
Col. 1, line 57, change "sterams" to --streams--.
Col. 2, line 17, change "added" to --adder--.
Col. 2, line 22, change "partly" to --parity--.
Col. 2, line 59, change the first term "P6X+3" to --$P_{6X+3}$--.
Col. 2, line 65, change the second term "$i^3_{4X+2}$" to --$i^3_{5X+2}$--.
Col. 3, line 6 should be inserted after line 9.
Col. 3, line 15, change "$i^3$" to --$i^3_X$--.
Col. 3, line 17, change "chan-" to --channel--.
Col. 3, line 75, change "$S_{5X+1}$ +" to --$S_{5X+1}$ = --.
Col. 4, line 58, change "intervals" to --interval--
Col. 4, line 60, the equation should read --$s_{2X+2} = p_{2X+2} + e^P_{2X+2} + i^3_0 + e^{i3}_0 = e^p_{2X+2} + e^{i3}_0$--.
Col. 4, line 62, the second term "$e_3P_{X+2}$" should be --$e^p_{3X+2}$--.
Col. 4, line 63 after "$S_{2X+2}$" insert -- and $S_{3X+2}$--
Col. 4, line 72, change "$i_0$" to --$i^3_0$--.
Col. 5, line 6, change the second "$i^3_0$" to --$i^3_X$--.
Col. 5, Chart III, line 10 "5X+5" should be --6X+5-
Col. 5, Chart III, line 5 "$S_{5X+1}$ · S4X+1" should be --$S_{5X+1}$ · $S_{4X+1}$--.
Col. 5, Chart III, line 8 change "$i^3_{3X+1}$" to --$i^3_{3X-1}$ (Continued)

UNITED STATES PATENT OFFICE
CERTIFICATE OF CORRECTION

Patent No. 3,566,352 Dated February 23, 1971

Inventor(s) James Lee Massey

It is certified that error appears in the above-identified patent and that said Letters Patent are hereby corrected as shown below:

Col. 5, Chart III, line 7 change "$s_{5X+4} \cdot \bar{s}55X+3$ $s_{4X+3}$" to --$s_{5X+4} \cdot \bar{s}_{5X+3} \cdot s_{4X+3}$--.

Col. 5, Chart III, line 8 change "$i^2_{X+1}$" to --$i^2_{X-1}$--.

Col. 5, Chart III, line 1 change "$s_{X+2} \cdot s_{X+1} \cdot \bar{s}$ $s_0$" to --$s_{X+2} \cdot \bar{s}_{X+1} \cdot \bar{s}_X \cdot s_0$--.

Col. 5, Chart III, line 6, change "$s_{5X+4} \cdot \bar{\bar{s}}5X+3$ $\bar{s}5X+2 . s_{4X+2}$" to --$s_{5X+4} \cdot \bar{s}_{5X+3} \cdot \bar{s}_{5X+2} \cdot s_{4X+2}$--.

Col. 5, Chart III, line 7, change "$s_{5X+5} \cdot s5X+4$ $\bar{s}5X+3 . s_{4X+3}$" to --$s_{5X+5} \cdot \bar{s}_{5X+4} \cdot \bar{s}_{5X+3} \cdot s_{4X+3}$--.

Col. 5, Chart III, line 14, change "$s_{8X+4} \cdot 8X+3$ $\bar{s}8X+2 . s7X+2$" to --$s_{8X+4} \cdot \bar{s}_{8X+3} \cdot \bar{s}_{8X+2} \cdot s_{7X+2}$--.

Col. 5, Chart III, line 14 change "$i^1X+1$" to --$i^1X-1$--.

Col. 5, line 62, change "$!^3_{X-1}$" to --$i^3_{X-1}$--.

Col. 6, line 17, change "$i\ 1_0$" to --$i^1_0$--.

Col. 7, line 48, change "N[2N-1)X+" to --N[(2N-1)

Col. 8, line 58, change "reecived" to --received-

Col. 9, line 15, change "comprising" to --compris

Col. 9, line 45, change "from" to --for--.

Col. 10, line 10, change "for" second occurrence t --from--.

Signed and sealed this 13th day of February 1973.

(SEAL)
Attest:

EDWARD M. FLETCHER, JR.
Attesting Officer

ROBERT GOTTSCHALK
Commissioner of Patents